United States Patent [19]

Albertson

[11] Patent Number: 5,096,588
[45] Date of Patent: Mar. 17, 1992

[54] METHOD AND SYSTEM FOR OPTIMIZING THE OPERATION OF A TRICKLING FILTER

[76] Inventor: Orris E. Albertson, 1915 Wasatch Dr., Salt Lake City, Utah 84108

[21] Appl. No.: 659,739

[22] Filed: Feb. 25, 1991

[51] Int. Cl.⁵ ............................................. C02F 3/04
[52] U.S. Cl. .................................... 210/617; 210/618; 210/138; 210/142; 210/150; 210/151
[58] Field of Search ............................ 210/614–619, 210/739, 96.1, 138–156, 209, 520

[56] References Cited

U.S. PATENT DOCUMENTS

| | | | |
|---|---|---|---|
| Re. 22,144 | 7/1942 | Ward | 210/617 |
| 2,141,979 | 12/1938 | Halvorson et al. | 210/617 |
| 2,889,996 | 7/1959 | Kadden | 210/150 |
| 3,825,119 | 7/1974 | Rost | 210/139 |
| 4,486,310 | 12/1984 | Thornton | 210/617 |
| 4,931,183 | 6/1990 | Klein et al. | 210/617 |

*Primary Examiner*—Thomas Wyse
*Attorney, Agent, or Firm*—Richard F. Bojanowski

[57] ABSTRACT

A method and system for optimizing the operation of a trickling filter. Optimization is obtained by using a pair of controlling devices, a timer and an electric motor in combination. The electric motor rotates the distributor mechanism of the trickling filter in response to signals transmitted thereto by the first and second controller. The timer activates the first controller during operation to provide a SK value of between 25-500 mm/pass. During non-peak hours, the timer activates the second controller for flushing the biomass used in the trickling filter operation. The flushing is accomplished at SK values of between 200-1000 mm/pass. A method is also disclosed incorporating the above system.

13 Claims, 2 Drawing Sheets

METHOD AND SYSTEM FOR OPTIMIZING THE OPERATION OF A TRICKLING FILTER

BACKGROUND OF THE INVENTION

1. Field of Invention

This invention relates generally to the biological treatment of wastewater and particularly to a method and system for optimizing the operation of a trickling filter.

2. Description of the Prior Art

The biological treatment of wastewater for the removal of oxygen demanding carbon and nitrogen compounds has been in use for many decades, both in the United States and Europe. Although there are several types of systems available, the rotary biological filter and the trickling filter are the most common. The trickling filter is used primarily for reducing levels of BOD (biochemical oxygen demand) and TSS (total suspended solids) as well as the oxidation of ammonia to nitrates. Depending on the predominant ambient temperature at which the trickling filters are operated, some of the filters are covered or domed, while others are not. Examples of biological filters can be found in U.S. Pat. Nos. 2,642,394; 3,275,147; 3,596,767 and 4,486,310.

In order to better understand the current status of biological filters in the art, the following publications are of particular interest: Hawkes, H.A. "The Ecology of Waste Water Treatment" published by the MacMillan Co., New York, N.Y. 1963; Albertson, Orris E., "Slow Down That Trickling Filter!" WPCF Operations Forum, A WPCF publication for wastewater professionals, January, 1989, and West Germany, Ein Regelwerk der Abwassertechnischen Vereinigung (ATV) Arbeitblatt A135 Section 3.2.2, Tropfkorperbemessung, April 1983.

The conventional trickling filter utilizes a film of biomass fixed on a media to remove and aerobically convert organic matter to carbon dioxide, water and additional biomass and to oxidize ammonia to nitrates. The fixed media generally consists of rock, plastic or wood. The surface area of the media varies from 12-15 ft$^2$/ft$^3$ for rock and wood to 27-45 ft$^2$/ft$^3$ for plastic. New construction of trickling filters uses predominantly plastic modules as its media at depths of at least 5 ft. to higher than 40 ft.

Wastewater is distributed over the biomass fixed to media through an overhead rotary distributor having generally two to four nozzled arms or spreaders. This insures a relatively even distribution of wastewater over the fixed biomass and thereby produces a relatively constant loading throughout the filter area.

Microorganisms and other forms of biological life are the active agents for converting the organic carbon and nitrogen into environmentally acceptable products. As a result, a number of operating parameters affect the efficient operation of trickling filters. Some of these include temperature, organic loading, aeration, wastewater characteristics, filter depth and biomass thickness, to name but a few.

In current practice, it is not uncommon to utilize biomass thickness of between 0.10 to 0.30 inch (2.5-8 mm) as reported in the Albertson publication, mentioned above. Such biomass thicknesses can reduce the aerobic surface area by a factor of 20% or more. The aerobic biomass may be only 5-10% of the total biomass on the media. The excess or remaining biomass (90-95%) serves no useful purpose in organic removal. Instead, the excess accumulation of biomass produces numerous operating problems, such as (1) production of odors; (2) provides a haven for flies and snails; (3) reduces the aerobic surface area; (4) causes excess sloughing of biomass which in turn causes an imbalance to downstream processes and loss of aerobic biomass; and (5) discolors the filter effluent.

Although there are a number of factors which affect the performance of trickling filters, such factors generally affect, either directly or indirectly, the growth of its active agent, the biomass. Therefore, one can conclude that it would be highly beneficial to control the biomass thickness to minimum levels and thereby provide a biomass layer which is predominantly aerobic and eliminate, as much as possible, the underlayer of anaerobic biomass. In the past, the biomass thickness has been partially and often ineffectively controlled by inconsistent and intermittent dosing or flushing of the media. Since trickling filter distributors are normally driven by the hydraulic jetting action of its nozzled arms, any increase in wastewater flow also increases the speed at which the nozzled arms pass over the biomass. With such systems, the instantaneous dosing or flushing of the biomass is frustrated.

In 1983, West Germany reported in a publication identified above that the dosing rate or flushing intensity (SK value) of biomass was critical in improving the efficiency of trickling filters. SK may be defined generally as the depth of water discharged to the surface of the filter media per pass of a distributor arm. This SK (spulkraft) value is determined by the following formula:

$$SK = \frac{(q + r)(1000 \text{ mm/m})}{(a)(n)(60 \text{ min/hr})}$$

Wherein "SK" represents the flushing intensity per pass in mm/pass, "q+r" represents the total average hydraulic flow in m$^3$/m$^2$/hr, "a" represents the number of distributor arms and "n" represents the rotational speed in rev./min.

Currently, SK values of between 2-10 mm/pass of an arm are common. Recently, (Albertson publication) SK valves of 50-150 mm/pass were found to be highly beneficial. Still more recently, Albertson determined that SK values up to 680/mm/pass have produced optimum results on strong (high BOD loadings) waste waters. However, this does not mean that still higher SK values would be more beneficial as, at some point, high SK values will impair the filter's performance even if the biomass thickness is near optimum. Therefore, based on the prior art, there appears to be no particular optimum SK value for any given trickling filter. This is primarily due to the wide range of operating variables which may exist for any given wastewater. It would also appear that the optimum SK value for biological treatment will vary substantially from the optimum SK value for flushing of excess biomass.

SUMMARY OF INVENTION

Therefore, a primary object of this invention is to provide a system and operational procedure for optimizing the efficiency of trickling filters.

Another object is to provide a system whereby optimum SK values can be established for treatment of wastewater and for flushing of the biomass. Still another object of this invention is to provide a system and method of operation whereby the performance of a trickling filter is enhanced without having to continually monitor and control a multitude of operating variables.

These and other objects of this invention are accomplished by a system which utilizes a distributor adapted with a variable speed, remotely controlled, electric motor drive, a timer and a pair of speed controllers, whereby one of the controllers controls the speed of the distributor arms during normal operation and the other controls the speed of the distributor during flushing periods.

The trickling filters would be automatically controlled to provide an optimum SK value during treatment of between about 5–150 mm/pass and during flushing a SK value of between about 250–1000 mm/pass.

The system and method of this invention is particularly suited for use on at least two trickling filters concomitantly operated at identical loading conditions except that different SK values would be used alternatively during treatment and flushing for each of the trickling filters. Based on the performance of the two trickling filters, the SK value of the less desirable performer would be altered until a better performance value is realized. This operational sequence would be continued until the optimum SK values for treatment and flushing are defined and employed for all units.

The timer would be set so that flushing of the biomass would occur during low load periods, (e.g., between 1:00 A.M. and 6:00 A.M.) and that optimum speed would be used for treatment of the wastewater during peak or high load periods (e.g., between 6:00 A.M. and 1:00 A.M.)

DESCRIPTION OF THE PREFERRED EMBODIMENTS

Figure 1:
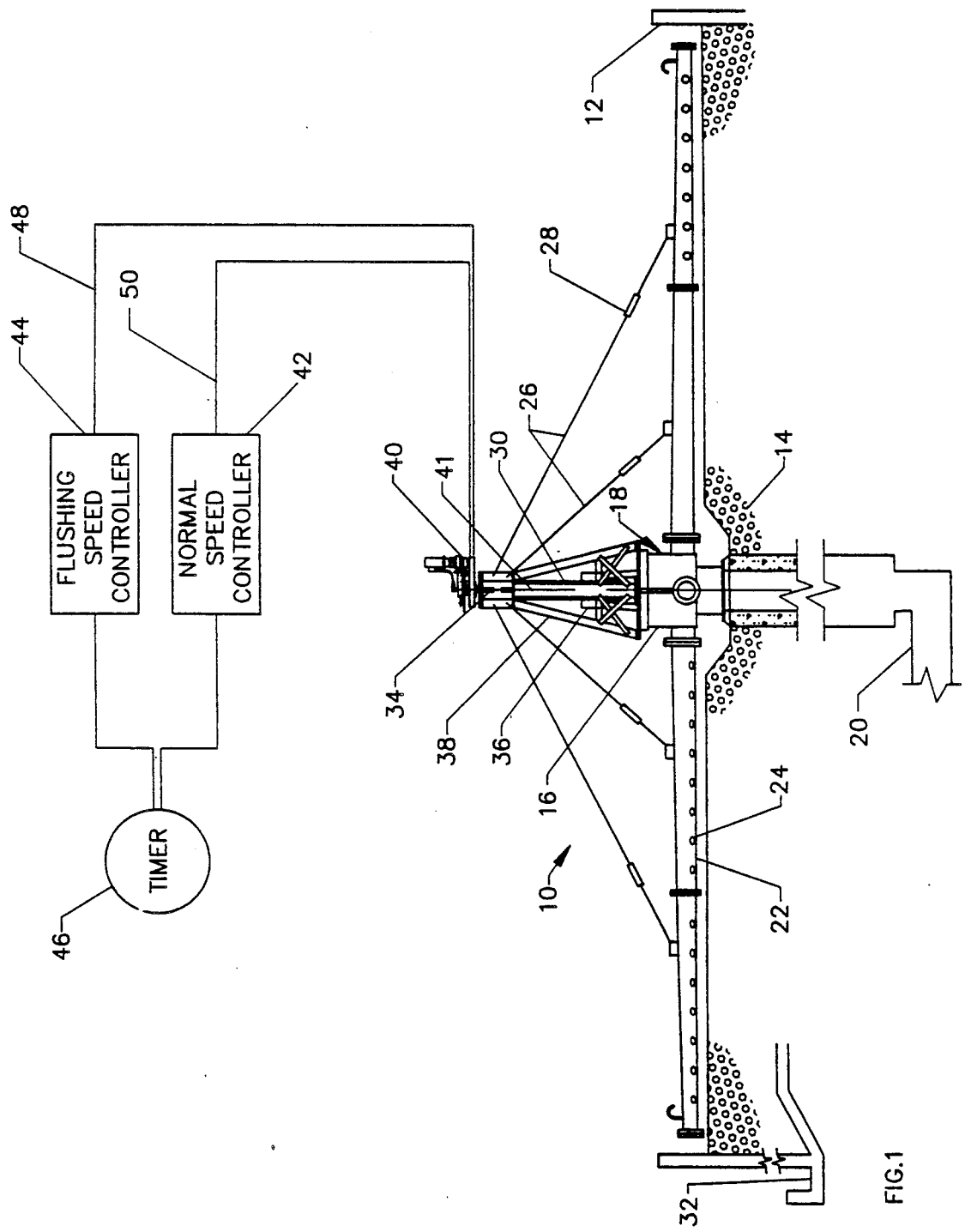
FIG. 1 is a partial cross sectional view and side view illustrating a typical wastewater trickling filter adapted with an electric motor which is remotely controlled by a pair of controllers and a timer.

Referring to the drawings wherein like reference numerals designate identical or corresponding parts in both Figures, a system and method of this invention is shown generally in FIG. 1 as numeral 10.

Specifically, a typical trickling filter includes a tank 12 constructed of a water impervious material such as concrete or steel and is generally circular in shape. The interior of the tank is filled with a media 14 of stone, wood slats or plastic bundles or particulates. Preferably, the media selected is one having a high surface area and is capable of minimal deterioration during use. Affixed to the media is a biological substance generally referred to as biomass. The biomass, consisting of living microorganisms, will feed and grow on the organic materials contained in the wastewater and which, during operation, will trickle through the biomass adhering to the media.

The wastewater is introduced into a barrel section 16 of a distributor shown generally by numeral 18 through a feed pipe 20 utilizing gravity flow or an auxiliary pump (not shown). The wastewater is then distributed into the distributor arms 22 and eventually dispersed over the biomass through orifices or nozzles 24 fixed and in communication with the distributor arms. Normally, each trickling filter will have two to six arms and preferably, at least four or the minimum required number to insure even distribution. The distributor arms are supported through cables or rods 26 fixed at various points along the arms radial extension and adjusted by turnbuckles 28. The other end of the rods 26 are fixed to a center mast 30 extending upwardly from the barrel 16. The effluent from the filter is collected in an underdrain network which leads to an outlet pipe or weir 32. Suitable thrust bearings 34 and stabilizing bearings 36 are included to provide for ease of rotation and to minimize wear during any rocking motion that may occur during high wind conditions. To insure stability of the entire system, suitable support members 38 are also provided.

A driving means 40, which is normally a $\frac{1}{4}$ to $\frac{1}{2}$ h.p. variable speed electric motor is fixed and communicatively geared to the center mast 34. When the motor 40 is energized, the distributor arms will rotate at a rate determined by remote high speed (normal) and low speed (flushing) controllers 42 and 44 for periods of time as determined by a twenty-four hour cycle timer 46. The timer is adapted to actuate either controller 42 or 44 in response to the information preset in the timer. The rate of rotation preset in either the high speed or low speed controllers is then electrically transmitted to the motor through lines 48 and 50, causing the distributor arms to rotate at a preselected speed for preselected time periods. The speed selected is capable of providing a SK value of between about 25–500 mm/pass during treatment and a SK value of between about 200–1000 mm/pass during flushing. Preferably, the treatment speed will provide a SK value of between about 50–200 mm/pass and the flushing speed will provide a SK value of between about 500–1000 mm/pass.

Figure 2:
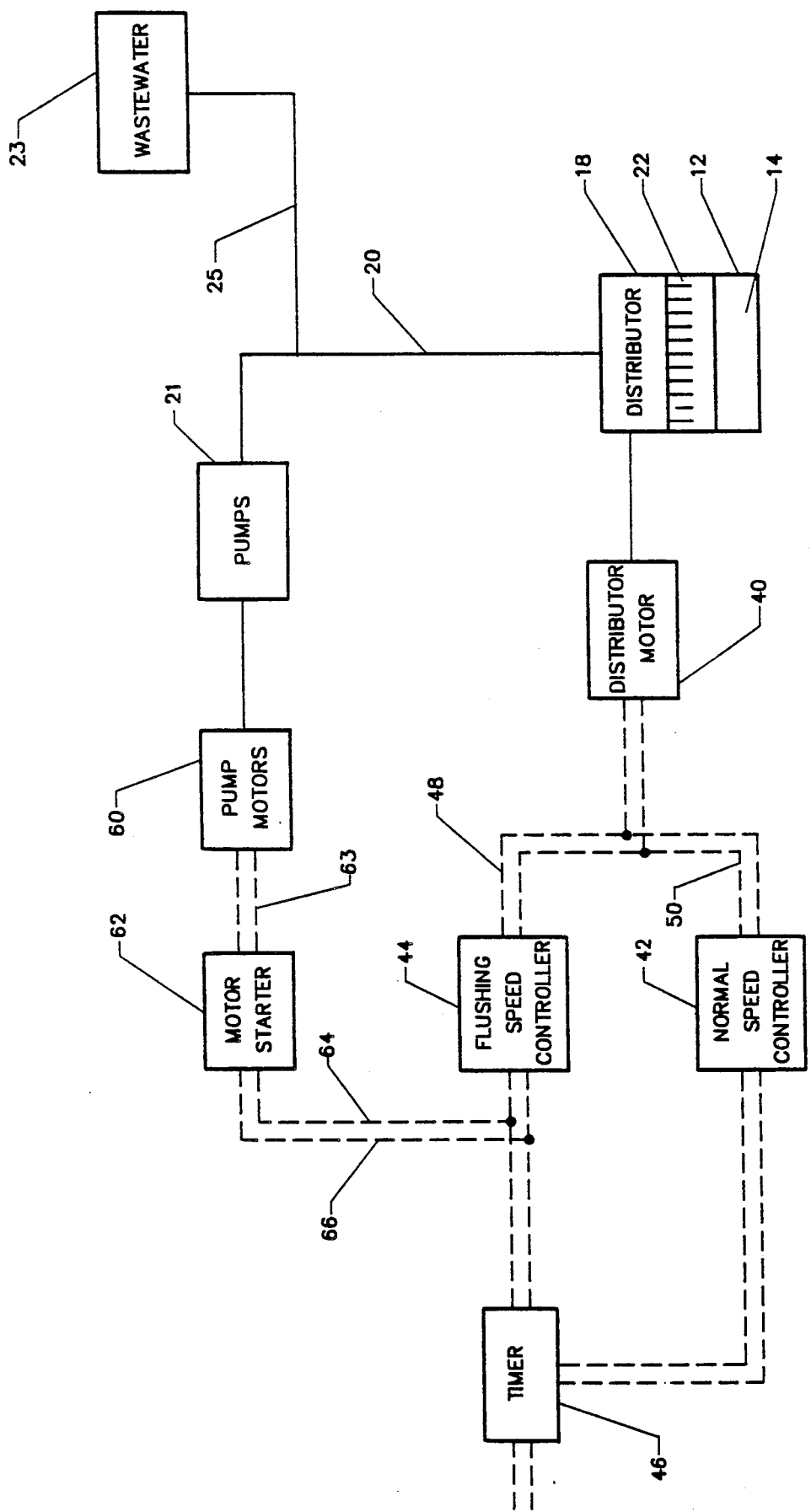
FIG. 2 is a block diagram illustrating how a trickling filter may be connected to an electric motor, a timer and a pair of controllers to provide the system of this invention.

As can be seen in FIG. 2, the operation of the system and method of this invention is depicted in block diagram form. Wastewater is introduced into a rotatable distributor 18 from a wastewater source 23 by gravitational flow through lines 25 and 20. If desired, an auxiliary pump (not shown) may be used to augment and thereby increase the flow. The wastewater is distributed over the biomass 14 contained in tank 12 through nozzled arms 22 extending radially and outwardly from the rotatable distributor. Rotation of the distributor and radially extending arms is accomplished by an electric distributor motor 40. The rate of movement of the distributor is controlled by a pair of controllers 42 and 44 through electrical conduits 48 and 50. Under typical operation, each arm of the distributor will make one revolution during each 2–30 minute period which is the equivalent to 0.03 to 0.5 revolution/minute. This rate of speed will generally produce a SK value of between about 25–500 mm/pass. The "mm" in the SK value represents the depth of the wastewater that would be discharged onto the surface of the trickling filter as the arms of the distributor passes over the media. In other words, a reduction of distributor speed will increase the SK value as will an increase in the rate of flow of wastewater into the filter. The timer 46 determines which of the controllers shall be activated and the period of time that it remains activated. If, for example, an operator desires to operate a filter at a SK value of 100 for 18 hours between 6:00 A.M. to 12:00 P.M., the SK value, or an equivalent indicum, would be set in controller 42 and the desired time periods would be set into the timer 46. When the operator determines that the filter is in need of flushing, the flushing SK value or an equivalent indicium, for example 500 mm/pass, would be set in controller 44 and the beginning and ending time for the flushing sequence would be introduced into timer 46.

If for any reason the controller is unable to reduce the rotation of the distributor arms to obtain a higher SK value, as may be needed during flushing, the operator may increase the rate of flow of wastewater into the filter and thereby further increase the SK value. This can be accomplished by either increasing the flow of wastewater through lines 25 and 20 or by activating a motor starter 62 through timer 46 and electrical lines 64 and 66 which in turn activates the pump motor 60 and pump 21 to recycle some of the effluent from the trickling filter into the distributor through line 33.

As previously alluded to in the specification, the filter distributor is operated at optimum treatment speeds, during peak periods; that is, when the wastewater contains a higher concentration of organic materials. For example, the timer would be set for normal operating conditions from about 6:00 A.M. to 12:00 P.M., when higher concentrations of municipal and industrial wastes are being introduced into the wastewater. The flushing cycle would normally be utilized during the low loading periods, such as 12:00 A.M. to 6:00 A.M. when the wastewater contains a lesser amount of organic waste materials and while flows are generally lower. Obviously, the volume of wastewater or recycled effluent introduced into the filter can be substantially increased during the slow periods as very little organic material would be present. Therefore, an increase in flow will not adversely effect the treated effluent quality of the filter.

Most wastewater treatment plants have at least two trickling filters that are operated on a twenty-four (24) hour basis. By adapting the trickling filters with motors, controllers and timers so that it would operate in the manner heretofore described, a convenient system is available for maximizing the efficiency of the trickling filters on an ongoing and continuous basis.

This is accomplished by testing two different SK valves under a strict schedule. For example, one of the filters would operate at a SK value of about 80 mm/pass and the other at a SK value of about 120 mm/pass for the same time period of, for example, 21 hours. Both filters would then be flushed for three hours at a SK value of about 500 mm/pass. If, after ten (10) days of operation, for example, the 120 mm/pass unit outperformed the 80 mm/pass unit, then the lower SK unit would be adjusted to a higher level, for example, about 150 mm/pass, and the above ten (10) day test repeated. With this form of testing, the better performance value is used as a baseline and would be continued until an optimum SK value was determined. When the optimum operating SK values are determined, the same type of testing can be done to determine the optimum flushing intensity and duration. For example, one filter would be operated at a SK value of about 500 mm/pass for three hours/day, and the other at 1.5 hours at a SK value of about 500 mm/pass. If the 1.5 hours/day produced better results than the other, the next test would increase or decrease the flushing time periods or the SK value on one of the filters and the results compared.

The timers and controllers that may be used in this invention are conventional devices readily available on the market. Examples of suitable devices are timed speed controllers such as those manufactured by or are available through Diversified Electronics. Suitable controllers are basically potentiometers available, for example, through Cutler Hammer. In larger facilities, a microprocessor can be employed to control several, or more, distributors.

One added advantage that the system and process of this invention has over systems now in use is that if there is a substantial change in influent quality or if the growth rate of the biomass is altered due to seasonal or temperature changes, the SK values can be conveniently modified by changing the information in the controllers and timers.

If a more sophisticated system is desired, sensors may be used to measure the BOD, TOC or COD concentrations, for example, in the influent and effluent of a trickling filter. The measurements obtained would be entered into a computer and analyzed. Based on the analysis, signals would be sent to the controllers and timer altering the information previously entered and thereby enhance the operation of the trickling filter by modifying the SK values then in use. The result would be a substantially fully automated system.

Obviously, many modifications and variations of the present invention are possible in light of the above teachings. It is therefore to be understood that, within the scope of the appended claims, the invention may be practiced otherwise than is specifically described.

I claim:
1. A trickling filter comprising:
   (a) a tank having a liquid inlet for receiving wastewater and an outlet;
   (b) a media to which a biomass is fixed is carried within said tank;
   (c) a rotatable distributing means for evenly distributing wastewater received from said inlet over said biomass;
   (d) a remotely controlled, variable speed motor for driving said distributing means;
   (e) a first controlling means operably connected to said variable speed motor and to a timer wherein said first controlling means is capable of controlling the rotatable speed of the distributing means to provide a SK value most conducive to reducing the BOD level in wastewater;
   (f) a second controlling means operably connected to said variable speed motor and to said timer wherein said second controlling means is capable of controlling the rotatable speed of the distributing means to provide a SK value most conducive for flushing and sloughing said biomass from said media;
   (g) A signal means for transmitting information to said timer and said first and second controlling means whereby each of the controlling means are sequentially activated for a preselected period of time at preselected SK values.
2. The trickling filter of claim 1, in which said first controlling means is activated during periods of time in which said wastewater contains a higher concentration of organic materials.
3. The trickling filter of claims 1 or 2 in which said second controlling means is activated during periods of time in which said biomass is to be flushed.
4. The trickling filter of claim 1 in which said distributing means includes at least two radially extending arms adapted with nozzles for introducing said wastewater over said biomass.

5. The trickling filter of claim 1 wherein said first controlling means is capable of providing a SK value of between about 25-500 mm/pass.

6. The trickling filter of claims 1 or 5 in which said second controlling means is capable of providing a SK value of between about 200-1000 mm/pass.

7. The trickling filter of claim 1 wherein said filter includes a pumping means operably connected to said timer for introducing additional volumes of wastewater or recycled effluent into said distributing means for distribution over said biomass at preselected times in response to said signal means.

8. A method for optimizing the operation of a trickling filter over a 24 hour period comprising:
   (a) introducing wastewater over a biomass at a rate whereby a SK value of between about 25-500 mm/pass is achieved;
   (b) maintaining a SK value of between about 25-500 mm/pass for a time period of at least 15 hours;
   (c) increasing the volume of wastewater introduced over the biomass whereby a SK value of between 200-1000 mm/pass is achieved;
   (d) maintaining a SK value of between 200-1000 mm/pass for a time period of at least one hour; and
   (e) repeating steps (a) through (d) for another twenty-four (24) hour period.

9. The method of claim 8 wherein said wastewater in steps (a) and (b) is introduced over a biomass and thereafter maintained at a rate whereby a SK value of between about 50-200 mm/pass is achieved.

10. The method of claim 9 wherein said wastewater in steps (c) and (d) is introduced over a biomass and thereafter maintained at a rate whereby a SK value of between about 500-1000 mm/pass is achieved.

11. The method of claim 8 wherein said SK values are obtained by adjusting controllers capable of transmitting an electrical impulse and thereby altering the speed of rotation of electrically driven distributor arms.

12. The method of claim 11 wherein said time periods are controlled by a timer in electrical communication with said controllers.

13. A method of optimizing the operation of a pair of trickling filters wherein wastewater introduced into said filters is of essentially the same quality comprising:
   (a) introducing said wastewater over a biomass in a first trickling filter whereby a SK value of between about 25-500 mm/pass is achieved;
   (b) introducing said wastewater over a biomass in a second trickling filter whereby a SK value of about 40 mm/pass higher than the SK value of said first trickling filter is achieved;
   (c) maintaining the SK values established in steps (a) and (b) at a relatively constant SK value for a period of time exceeding "x" hours wherein "x" is at least fourteen hours;
   (d) increasing the SK value of said first and second trickling filter wherein essentially the same SK value of between about 200-1000 mm/pass is achieved in each filter;
   (e) maintaining the SK value achieved in step (d) for a time period of "y" wherein "y" is defined as twenty-four hours less "x";
   (f) continuing steps (a) through (e) inclusive for a period of at least "z" days, wherein "z" is at least seven days;
   (g) comparing the performance of said first and second trickling filters and determining which filter produced a better effluent and which produced a poorer effluent;
   (h) increasing or decreasing the SK value of the filter producing the poorer effluent by a factor of about 80 mm/pass; and
   (i) repeating steps (a) through (h) for at least one more sequence.

* * * * *